3 Sheets—Sheet 1.

W. S. SMOOT & H. H. HAMILTON.
Cartridge-Loading Machine.

No. 196,545. Patented Oct. 30, 1877.

Witnesses:
Will H. Dodge
[signature]

Inventors:
W. S. Smoot
H. H. Hamilton
By Dodge & Son.
Attys.

W. S. SMOOT & H. H. HAMILTON.
Cartridge-Loading Machine.

No. 196,545. Patented Oct. 30, 1877.

3 Sheets—Sheet 3.

W. S. SMOOT & H. H. HAMILTON.
Cartridge-Loading Machine.

No. 196,545. Patented Oct. 30, 1877.

Witnesses:
Will H. Dodge
Orrin P. Turnbull

Inventor:
W. S. Smoot
H. H. Hamilton
By Dodge & Son
Attys.

UNITED STATES PATENT OFFICE.

WILLIAM S. SMOOT AND HENRY H. HAMILTON, OF ILION, NEW YORK, ASSIGNORS TO E. REMINGTON & SONS, OF SAME PLACE.

IMPROVEMENT IN CARTRIDGE-LOADING MACHINES.

Specification forming part of Letters Patent No. 196,545, dated October 30, 1877; application filed January 12, 1877.

*To all whom it may concern:*

Be it known that we, W. S. SMOOT and HENRY H. HAMILTON, of Ilion, in the county of Herkimer and State of New York, have invented certain Improvements in Cartridge-Loading Machines, of which the following is a specification:

My invention relates to an automatic machine for charging metallic cartridge-shells with powder, seating the balls in the shells, and contracting the latter tightly upon the balls.

The invention consists in the construction and arrangement of devices for carrying out successively the operations of feeding the empty shells into the machines, forcing dies over the shells to insure their accuracy of form and size, carrying a plunger into the empty shells to insure the proper seating of the reenforce and such other parts as may be located in the base of the shell, charging the shell with powder, seating the ball in the mouth of the shell upon the powder, and, finally, contracting the mouth of the shells tightly upon the balls, and discharging the completed cartridges from the machine.

The invention also consists, especially, in the use of tubular vertical dies mounted in a carrying-wheel, and arranged to carry the shells, correct irregularities in their form or size, size the balls and guide them into the shells, and compress the shells upon the balls.

The invention also consists in a bell-alarm and a pendent ball, which is thrown forward in view of one of the attendants whenever the supply of powder in the hopper falls below a fixed limit.

The invention also consists in the combination of shell and ball carrying wheels, having an equal number of holes or seats lettered to correspond with each other, in order to enable the attendant to readily distinguish the corresponding holes in the two wheels, so that, in the event of a shell being omitted, or of the powder failing to enter a particular shell, the ball may be omitted from the corresponding hole of the ball-carrying wheel.

Figure 1:
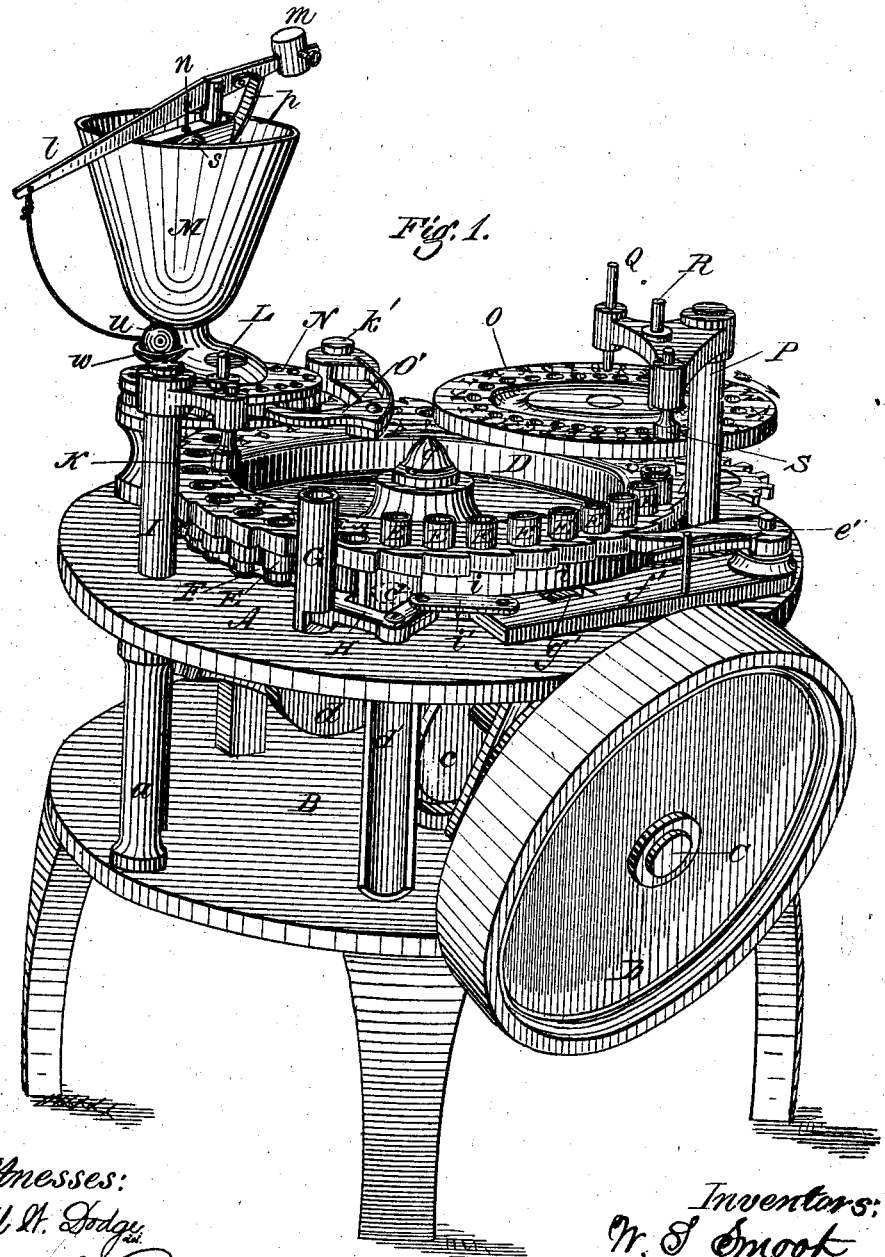
Figure 2:
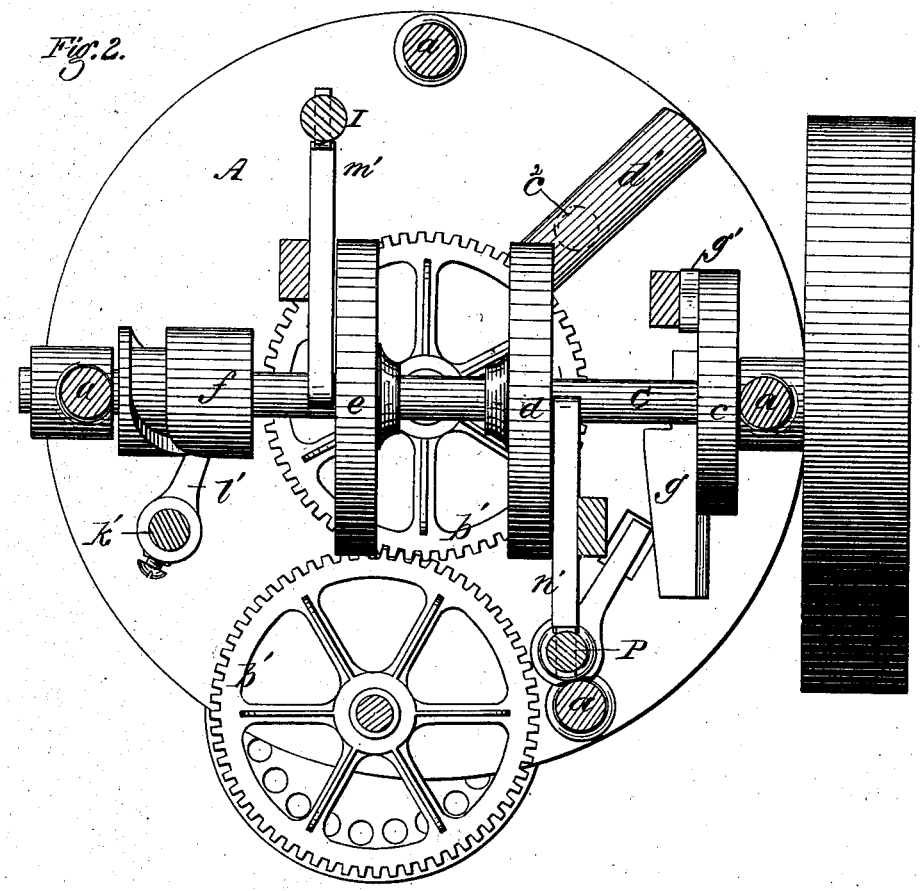
Figure 3:
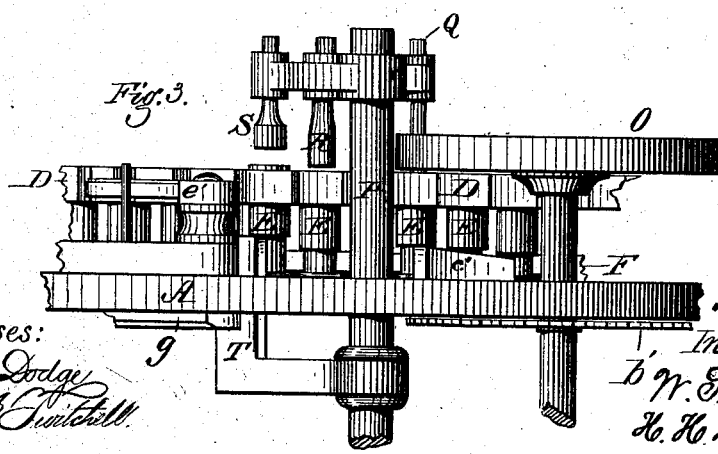
Figure 4:
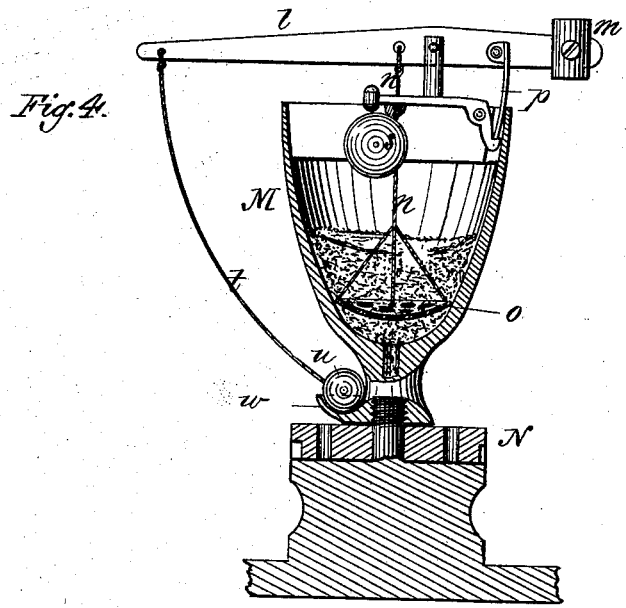
Figure 5:
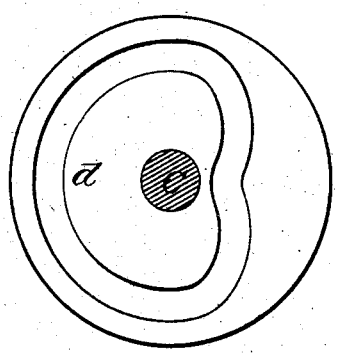
Figure 7:
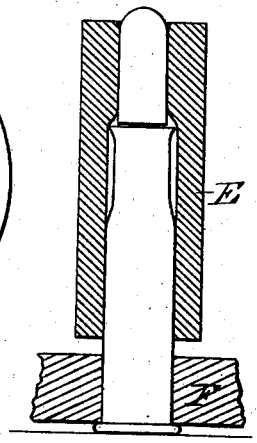
Figure 6:
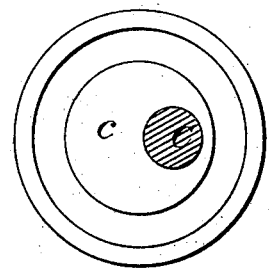
Figure 8:
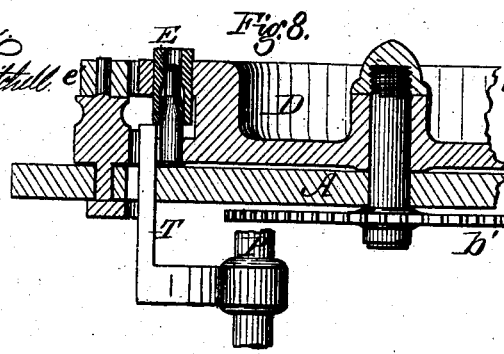

Figure 1 represents a perspective view of my complete machine; Fig. 2, a horizontal section of the same below the main shaft, looking upward, and showing the cams and gearing by which motion is communicated to the various parts of the machine; Fig. 3, a side view, looking from the point and in the direction indicated by the arrow in Fig. 1, of the upper part of the machine; Fig. 4, a sectional view vertically through the powder-hopper and measuring-wheel, with the alarm devices connected therewith; Figs. 5 and 6, face views of two of the main operating cams; Fig. 7, a vertical section through the center of one of the tubular dies; Fig. 8, a sectional view through the shell-carrying wheels and one of the dies.

In the drawings, A represents a circular top or bed plate, and B a corresponding plate mounted below the same, and connected therewith by rigid posts or standards $a$.

C represents the main shaft of the machine, mounted horizontally in bearings on the bottom plate B, and provided, as shown in Figs. 1 and 2, with a driving-pulley, $b$, and with four cam-wheels, $c$, $d$, $e$, and $f$, which transmit motion to all the working parts of the machine, as hereinafter described.

D represents a circular wheel to carry the cartridge-shells, mounted on a vertical axis on the center of the top plate, and provided with ratchet-teeth on its periphery, and with a series of vertically-sliding tubular dies, E, in its outer edge, at equal distances from each other and from the center of the wheel. These dies have an interior form such as represented in Fig. 7, corresponding exactly with the exterior form of the cartridge-shell, except that they are slightly enlarged at the proper point to prevent them from crushing down the shoulder existing in the body of those shells which are necked down, or reduced in diameter at the mouth, as is now customary in all cartridges using heavy charges of powder.

When the shells are of uniform diameter, or of a uniform taper from end to end, the dies will be made to correspond, and the enlargement above mentioned omitted.

The opening through the upper end of the dies (which latter are made somewhat longer than the loaded cartridges) is made of the exact diameter of the standard ball, so that it serves to reduce the balls to the proper standard in case they are too large, as well as to remedy any roughness or irregularity in their outer surface, and to guide them accurately into the shells while the latter are in the dies.

Below the wheel D in which the dies are mounted, and in such manner as to turn therewith, there is mounted another wheel, F, having its edge provided with semicircular notches of such size and location as to guide and hold the empty shells directly under the dies, in order that the latter may descend over and around them, as shown in Figs. 1, 3, and 8, and as hereinafter more fully explained.

For the purpose of feeding the empty shells into the notched wheel F, there is mounted on the plate or table A a vertical tube, G, having a lateral opening at its foot, and a horizontally-swinging arm, H, which carries the shells in succession, one at a time, from the foot of the tube into the notches in the wheel. As the arm carries one shell forward, the next remaining one in the tube rests upon the arm; but when the latter swings back, the next shell descends in front of it, and is in turn carried forward, the arm thus carrying the bottom shell forward at each advance.

It should, of course, be understood that the shells are placed in the tube in an upright position, one upon another, and that the opening and the arm are of such height that only one shell at a time is removed.

As soon as one shell is seated in the wheel F, the latter advances the proper distance to bring the next notch or seat in position to receive its shell, and so on repeatedly and continuously.

As soon as each shell is seated in the wheel F, its corresponding die E, which is previously raised, is permitted to descend over and around it, as shown in Fig. 8.

The elevation of the dies previous to their reaching the point at which the shells are placed under them is effected, as shown in Figs. 3 and 8, by means of an upright arm or dog, T, extending upward through the plate or table A, and having both a lateral and a vertical movement at its upper end, whereby it is caused to engage under the ends of the dies, and push them up in succession, one at a time, as they are advanced by the rotation of the wheel D. After being elevated by the arm or dog T, the shells ride upon and are sustained by a stationary raised track or ledge, i, which terminates at the feeding-dog H, as shown in Fig. 1, so that as each die reaches the end of the track and passes therefrom it descends over the shell last inserted into the notched wheel by the feeding dog or arm.

The lateral movement of the die-elevating arm T, whereby it is enabled, when elevated, to swing back out of the way of the next advancing die, and then, after descending, to engage under said die, is effected, by means of a sliding wedge, g, mounted on the under side of the table A, and arranged to bear against the back of the arm, as shown in Figs. 2, 3, and 8, the wedge being advanced at the proper time to force the end of the arm under the die, and afterward retracted in order that the arm may be pushed back by the advancing die out of its way. It will thus be seen that the arm raises the dies, one after another, upon the track or support i, and that after passing over the latter they descend, one after another, upon the shells introduced under them by the arm or dog H.

The shells held within the dies are carried forward, by the rotation of the wheels D and F, below two depending pins, K and L, attached to a head-piece on a vertical v-moving shaft, I, the wheels being given an intermittent movement, and the parts so arranged that each time they stop the pins K and L are caused to descend. The pin K, having an enlarged end, bears upon the dies, and forces them down flush with the top of the wheel D, so that they pass under the powder and the ball feeding wheels, and so also that they may be seated firmly and accurately upon the shells. The pin L, which is longer than its neighbor, passes down through the dies for the purpose of seating properly in place any re-enforce cups or other parts belonging in the base of the shell which may chance to be displaced when the shells enter the machine.

Above the wheel D, beyond the pins K L, there is mounted a horizontal powder-feeding wheel, N, surmounted by a powder-hopper, M. The hopper is provided at its bottom with a single outlet through which the powder passes into holes or cells extending down through the edge of the wheel N.

By means of ratchet-teeth formed on the edge of the wheel N and a pawl, O', carried by an arm on a vertical rock-shaft, k', the powder-wheel is given an intermittent rotary movement, and caused to discharge its charges of powder in succession through the dies into the cartridge-shells as they are brought forward, one after another, by the carrying-wheels and dies.

For the purpose of giving an alarm when the supply of powder in the hopper is reduced to a small amount, to the end that there may be no danger of the supply being exhausted and the balls being seated in empty shells, we connect with the hopper the arrangement represented in Figs. 1 and 4.

A horizontal lever, l, mounted on a cross-bar in the top of the hopper, is provided on one side of its fulcrum with an adjustable weight, m, and on the other side of the fulcrum with a cord, n, attached to a perforated false bottom, o, in the base of the hopper. On the weighted end of the lever there is mounted a pawl, p, to operate the hammer or striker of a gong, s, mounted on the cross-bar which sustains the lever. At its opposite end the lever is provided with a cord, t, the lower end of which is provided with a rubber ball or other light object, u, which ordinarily rests in a cup, w, provided for the purpose at the base of the hopper.

While the quantity of powder in the hopper remains above the minimum limit its weight upon the perforated bottom holds the same down; but the instant that the quantity falls below the limit the weight $m$ preponderates and tips the lever, thereby causing the pawl to sound the bell, and at the same time causing the ball $u$ to swing forward against or in view of one of the attendants.

Closely above the shell-carrying wheel D, beyond the powder-hopper, there is mounted a horizontal ball-carrying wheel, O, provided with the same number of ball-holes down through it that there are shell-carrying dies in the wheel D.

The shafts which sustain the two wheels D and O are provided below the plate A with wheels $b'$, gearing into each other, as shown in Fig. 2, whereby the two wheels are caused to start and stop together, and the bullet-wheel caused at each stoppage to present a ball directly above one of the dies, the balls being inserted into the holes in the wheel O by hand, by an attendant.

At one side of the ball-carrying wheel O there is mounted an upright vertically-moving rod or shaft, P, provided with a head-piece having three rigid depending pins or arms, Q, R, and S, which serve—the first to force the balls from the holes in the wheel O into the upper ends of the dies E; the second, to enter the dies and force the balls down into the shells upon the powder; and the third, to force the dies down firmly upon the shells so as to contract the latter tightly around the balls and thereby complete the cartridges.

In order that the forcing of the balls into the shells may not depress the dies, and cause them to reduce the mouth of the shells prematurely, an inclined track or support, $c^1$, is secured below the feed-wheels, upon the plate or table A, as shown in Fig. 3. This track or support upon which the dies ride sustains them firmly while receiving the balls, but as the track terminates before the dies reach the pin R, they are left free to descend under the pressure of the latter.

After being completed by the action of the pin S on the dies, the cartridges are carried forward in the latter until they reach the arm T, which raises the dies from the cartridges to the track $i$.

The dies are carried forward on the track to receive new shells in the manner heretofore described, while the cartridges, bearing against the inner side of the track, are carried forward in the notched edge of the wheel F until they reach an opening, $c^2$, in the plate or table A, through which they fall into an inclined trough, $d'$, which delivers them from the machine.

The parts of the machine hereinbefore described constitute its main features and the essential part of our invention, and may be operated by any suitable mechanism, although it is preferred to employ the operating mechanism shown in the drawing and described below.

The wheel D, which has its edge provided with ratchet-teeth, is turned at regular intervals by a pawl, $e'$, mounted on a sliding bar, $f'$, operated by the upper end of a lever, $g'$, which latter is pivoted at its middle, and operated by a stud on its lower end entering a cam-groove in the side of the disk or wheel $c$, secured upon the main axle C, as shown in Figs. 1 and 2. The wheel D, in turn, through the gear-wheels before mentioned, imparts a corresponding motion to the bullet-feeding wheel O. The slide $f'$, on which the pawl is attached, also carries on the under side the wedge $g$, by which the lateral movement is given to the die-raising arm T. The slide also serves, through a connecting link, $i'$, to operate the swinging arm or dog H, by which the empty shells are fed into the machine, as shown in Fig. 1.

The rocking movement of the shaft $k'$, through which motion is imparted to the powder-wheel pawl, is produced by an arm, $l'$, attached to the lower end of the shaft, and entering a groove in the cam-wheel $f$ on the main shaft, as shown in Fig. 2.

The two vertically-moving rods I and P are operated, as shown in Fig. 2, by means of two levers, $m'$ and $n'$, connected with the respective rods, and operated by cam-grooves in the sides of the two wheels $d$ and $e$, secured upon the main shaft C.

In order that the powder may all enter the shells readily, and that the balls may be inserted without being scraped or injured by the edges of the shells, the latter will have their mouths flared outward or made of a bell form, as shown in Fig. 7. This flaring of the mouth of the shells, of which we believe ourselves to be the originators, is done by means of suitable mechanism at the time they are made, and it may be modified in form, and extend as circumstances require. This flaring of the shells, while it facilitates the entrance of the powder and balls, is readily overcome by the dies, the final pressure of which closes the edge of the shells inward snugly around the balls.

The flaring of the shells is of special advantage in loading them with patched balls, particularly those having paper patches, which are very liable to be torn and wrinkled in forcing the balls into the ordinary shells.

While the machine is shown and described as adapted for loading the flared shells, it is obvious that it may be used to load shells of any of the ordinary forms without the enlarged mouth.

It is, of course, obvious that, in order to prevent the premature closing of the end of the shells, the downward movement of the dies must be properly limited until after the insertion of the balls, when, in applying the final pressure, their upper ends are forced below the top of the wheel D.

Having described the machine and its operation in detail, its general and continuous operation may be briefly stated as follows:

The shells, being fed, by an attendant, in an upright position into the tube G, are carried by the arm H into the edge of the notched wheel F, where they are immediately caught and held by the dies E, riding from the end of the track $i$, and descending over and around them. The shells thus held in the dies are carried forward, by the rotation of the wheels D and F, under the pin or arm K, which forces the die snugly upon them, and then under the pin L, which passes down through the dies, and insures the proper seating of the re-enforces or other parts located within the shell. The shells next pass in the dies, under the powder-feeding wheel N, to receive the charge of powder, which is discharged into them through the dies. After receiving the powder, the shells and dies are carried under the ball-feeding wheel, which is supplied by an attendant, and the balls forced down by the pin Q, one into each die. The dies containing the charged shell and the ball are then passed to the pin R, which forces the balls down accurately and firmly into the shell, after which the dies are carried under the pin or arm P, which forces the dies down until they close the shells around the balls. The dies are then carried forward and raised from the cartridges, and the latter discharged.

Having described our invention, what we claim is—

1. In a cartridge-loading machine, a series of movable tubular dies, E, arranged to inclose and sustain the shells and guide the balls therein, substantially as shown and described.

2. In a cartridge-loading machine, a shell-carrying wheel, D, provided with tubular dies, E, arranged to move endwise therein, for the purpose of passing upon and off from the shells, substantially as shown and described.

3. The combination of the plate or table A, wheels D F, dies E, mounted in the wheel D, and arranged to move vertically, and feeding mechanism, substantially such as shown and described, for carrying the shells into the edge of the wheel F, below the dies.

4. In combination with a shell-carrying wheel, a feeding device consisting of a vertical tube, G, having an opening at its lower end, and a swinging dog or arm, H, arranged to operate substantially as shown and described.

5. The combination of the carrying-wheels D F and the vertically-moving dies E with the feeding mechanism, substantially such as described, the arm T, and the track $i$, whereby the dies are elevated, the shells placed thereunder, and the dies permitted to descend upon the shells.

6. In combination with the wheel D, provided with the vertical tubular dies E, the vertically-moving arm or pin K, arranged to force the dies firmly upon the shells prior to their being carried under the powder-hopper.

7. In combination with the wheel D and tubular dies E, the vertical pin L, arranged to enter the shells through the dies, for the purpose of seating the re-enforce or other displaced parts.

8. In combination with the powder-hopper M, the perforated false bottom $o$, weighted lever $l$, and pendent ball $u$, substantially as and for the purpose shown and described.

9. In combination with the hopper M, false bottom $o$, and weighted lever $l$, the pawl $p$, hammer $u$, and gong $s$.

10. In a cartridge-loading machine, the combination, substantially as shown and described, of an alarm or indicator with the powder-hopper, in such manner that the weight of the powder prevents the action of the alarm, until the supply of powder falls below a fixed limit.

11. In combination with the ball-wheel O and the wheel D, provided with the dies E, the vertically-moving pins or arms Q, R, and S, serving, respectively, to force the balls into the dies, to seat the balls in the shells, and to force the dies down for the purpose of closing the shells upon the balls.

12. The track or support $i$, arranged, as shown, to sustain the dies E, while the balls are being seated therein, in order to prevent the shells from being reduced at the mouth prematurely.

13. In combination with the wheel D and dies E, the vertically and laterally moving arm T, for the purpose of raising the dies from the shells.

14. In combination with the wheels D F, dies E, and track or support, the arm T, journaled upon the vertically-moving shaft, and the sliding wedge $g$, bearing against the arm, as and for the purpose described.

15. The reciprocating slide $f'$, provided with the pawl $e'$ and wedge $g$, and connected with the swinging dog H, as shown and described.

16. In a cartridge-loading machine, the combination of shell and ball carrying wheels, having their holes or seats lettered or otherwise marked to correspond with each other, for the purpose set forth.

WILLIAM S. SMOOT.
HENRY H. HAMILTON.

Witnesses:
H. H. BENEDICT,
WILL W. DODGE.